(12) United States Patent
Gupta et al.

(10) Patent No.: US 7,685,806 B2
(45) Date of Patent: Mar. 30, 2010

(54) METHOD AND APPARATUS FOR SUPERSONIC AND SHOCK NOISE REDUCTION IN AIRCRAFT ENGINES USING PNEUMATIC CORRUGATIONS

(75) Inventors: Anurag Gupta, Clifton Park, NY (US); Seyed Saddoughi, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1126 days.

(21) Appl. No.: 11/319,645

(22) Filed: Dec. 29, 2005

(65) Prior Publication Data
US 2007/0151254 A1   Jul. 5, 2007

(51) Int. Cl.
F02K 5/02   (2006.01)
F02K 7/00   (2006.01)
(52) U.S. Cl. .......................... 60/247; 60/39.38; 60/770
(58) Field of Classification Search .................... 60/247, 60/231, 770, 39.38, 39.5, 39.76
See application file for complete search history.

(56) References Cited

U.S. PATENT DOCUMENTS

| | | | |
|---|---|---|---|
| 3,759,039 A * | 9/1973 | Williams ..................... 60/231 |
| 6,308,898 B1 * | 10/2001 | Dorris et al. ........... 239/265.17 |
| 6,629,674 B1 | 10/2003 | Saddoughi et al. | |
| 6,758,032 B2 * | 7/2004 | Hunter et al. .................. 60/231 |
| 6,869,049 B2 | 3/2005 | Saddoughi | |
| 6,904,750 B2 * | 6/2005 | Venkataramani et al. ... 60/226.1 |
| 6,931,858 B2 * | 8/2005 | Venkataramani et al. ...... 60/776 |
| 7,412,832 B2 * | 8/2008 | Gutmark et al. ................ 60/770 |
| 7,520,123 B2 * | 4/2009 | Saddoughi et al. ............. 60/247 |
| 2004/0123583 A1 * | 7/2004 | Nordeen et al. ............. 60/226.1 |
| 2004/0262447 A1 | 12/2004 | Graziosi et al. | |
| 2006/0042228 A1 * | 3/2006 | Venkataramani et al. ... 60/226.1 |
| 2007/0144179 A1 * | 6/2007 | Pinard et al. ................... 60/776 |
| 2008/0115480 A1 * | 5/2008 | Rasheed et al. ............. 60/39.76 |
| 2009/0064661 A1 * | 3/2009 | Younsi et al. .................. 60/247 |

* cited by examiner

*Primary Examiner*—William H Rodriguez
(74) *Attorney, Agent, or Firm*—Penny A. Clarke

(57) ABSTRACT

An aircraft engine is provided with at least one pulse detonation device connected to an engine exhaust nozzle portion with a plurality of supersonic injectors. The flow from the pulse detonation device is passed through the supersonic injectors into the primary engine flow path. The injector flow is injected at a velocity such that the injected flow penetrates into the primary flow path. This injected flow creates a virtual obstacle for the primary flow, and their interaction creates a virtual surface or an aero-lobe, thus controlling the nozzle exit area to reduce engine noise.

28 Claims, 4 Drawing Sheets

METHOD AND APPARATUS FOR SUPERSONIC AND SHOCK NOISE REDUCTION IN AIRCRAFT ENGINES USING PNEUMATIC CORRUGATIONS

BACKGROUND OF THE INVENTION

This invention relates to a method and apparatus for mitigating or reducing supersonic/shock noise generated by aircraft engines, by creating flow structures that form virtual aerodynamic shapes, e.g., lobes, that reduce shock cell strength and enhance mixing.

In military and some commercial aircraft jet engines, the jet engine exhaust is supersonic and contains shock cell structures that create significant noise due to the interaction between the shock cell structures and the shear in the jet flow. These shock cells are primarily generated during the engine nozzle's off-design operation. Stated differently, significant shock cells are generated when the engine nozzle is in either an under-expanded or over-expanded state, depending on the mismatch between the driving pressure and the ideally expanded pressure ratio that would correspond to the current geometry of the engine nozzle.

Additionally, as mixing is significantly suppressed in supersonic shear flows, traditional means of reducing jet engine noise for those with subsonic exhausts are ineffective unless applied on a large scale, which can result in significant system penalties, such as increase in weight and drag, and loss of thrust and operability.

Previous attempts to address shock cell noise in jet engines have proven to be less than desirable. In some applications the use of variable iris nozzles allow for some limited control on the degree of over and under expansion of the nozzle. However, the requirements on thrust and actuation limits in the area control mechanisms limit their use to reduce shock-noise. Further, in other applications the use of passive devices, such as mechanical lobe mixers, have been explored. However, as these devices are passive and exist in the flowpath at all times, the engine system must absorb the penalties of these devices being in the flowpath at all times, even when not necessary. Even if there are no performance penalties, the immersion in a hot flowpath limits their life/reliability and has a negative impact on system cost.

SUMMARY OF THE INVENTION

In an embodiment of the present invention, an aero-lobe, or virtual surface, is created in the flowpath due to an interaction between the supersonic flow of the engine with multiple supersonic injectors. Specifically, the present invention employs at least one supersonic injector which injects a supersonic flow from a wall of engine into the primary engine flow path. The injector flow is injected at a velocity such that the injected flow penetrates into the primary flow path. This injected flow creates a virtual obstacle for the primary flow, thus creating an aero-lobe or virtual surface which, in turn, creates a shock front.

In an embodiment of the present invention, one or more supersonic injectors are positioned very close to, or at the edge, of the nozzle to achieve the desired results. The injectors may be positioned or embedded in the nozzle lip or on the pylon close to the nozzle exit.

By adjusting various parameters, such as the shape, size, and number of the injectors, and speed of the injector flow, the shape of the shock front that forms between the primary engine flow and the flow of the injectors can be controlled and configured as desired. Thus, the size and shape of the shock front can be tailored to reduce the shock cell strength, and thus noise, by controlling the effective area ratio of the nozzle at its exit. This allows for the reduction of shock-cell noise, on-demand, without permanent structures or lobes formed in the engine exhaust.

In an embodiment of the present invention, the flow for the supersonic injectors is provided by a pulse detonation device.

As used herein, a "pulse detonation (or deflagration) device" ("PDD") is understood to mean any combustion device or system where a series of repeating detonations (or deflagrations) within the device cause a pressure rise and subsequent acceleration of the combustion products as compared to the pre-burned reactants. Typical embodiments of PDDs include a means of igniting a fuel/oxidizer mixture, for example a fuel/air mixture, and a confining chamber, in which pressure wave fronts initiated by the ignition process coalesce to produce a detonation wave. Each detonation (or deflagration) is initiated either by external ignition, such as spark discharge, laser pulse, or plasma pulse or by gas dynamic processes, such as shock focusing, autoignition or by another detonation via cross-firing. The geometry of the detonation chamber is such that the pressure rise of the detonation wave expels combustion products out the PDD exhaust to produce a high-velocity or supersonic jet stream. As known to those skilled in the art, pulse detonation may be accomplished in a number of types of detonation chambers, including detonation tubes, shock tubes, resonating detonation cavities and annular detonation chambers. Additionally, "pulse detonation device" or "PDD", as used herein, includes devices which use deflagration or detonation to generate a sufficient pressure rise to achieve the desired performance according to the present invention. In deflagration devices detonation is not necessary, but all that is needed is a pressure rise due to deflagration, where the pressure is significant enough to allow the injector flow to penetrate the exhaust flow.

BRIEF DESCRIPTION OF THE DRAWINGS

The advantages, nature and various additional features of the invention will appear more fully upon consideration of the illustrative embodiment of the invention which is schematically set forth in the figures, in which.

DETAILED DESCRIPTION OF THE INVENTION

The present invention will be explained in further detail by making reference to the accompanying drawings, which do not limit the scope of the invention in any way.

Figure 1:
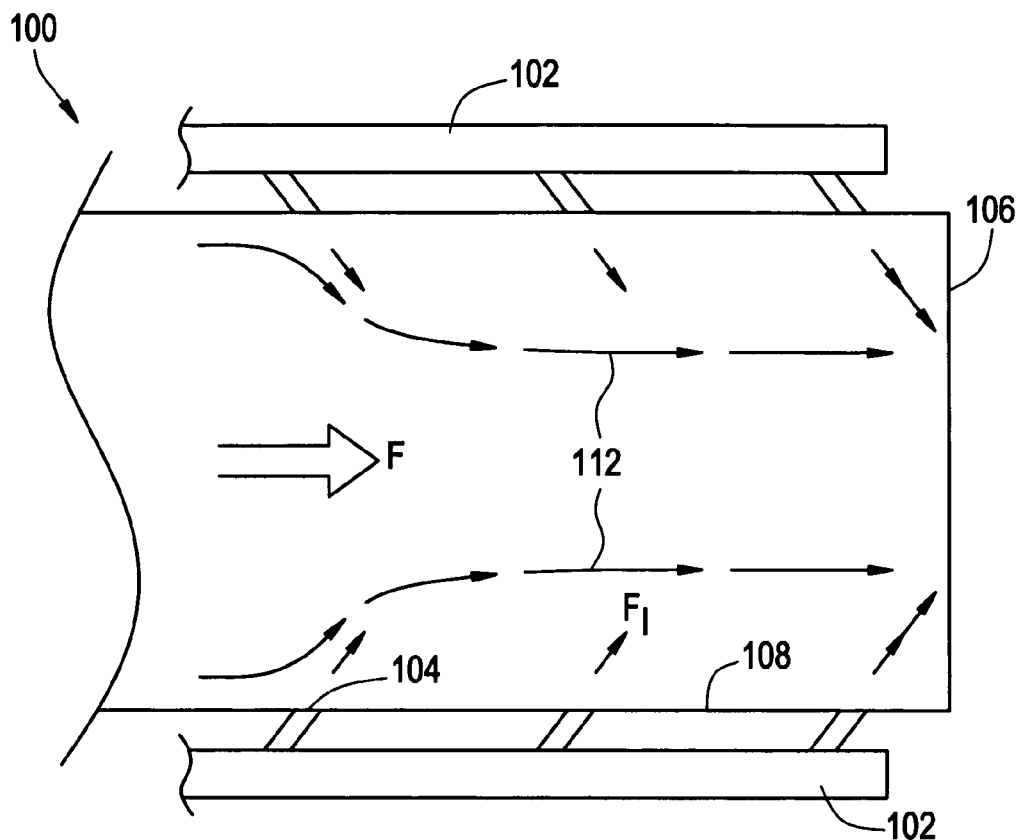
FIG. 1 is a diagrammatical representation of an engine nozzle containing a noise reduction system according to an embodiment of the present invention.
Figure 2:
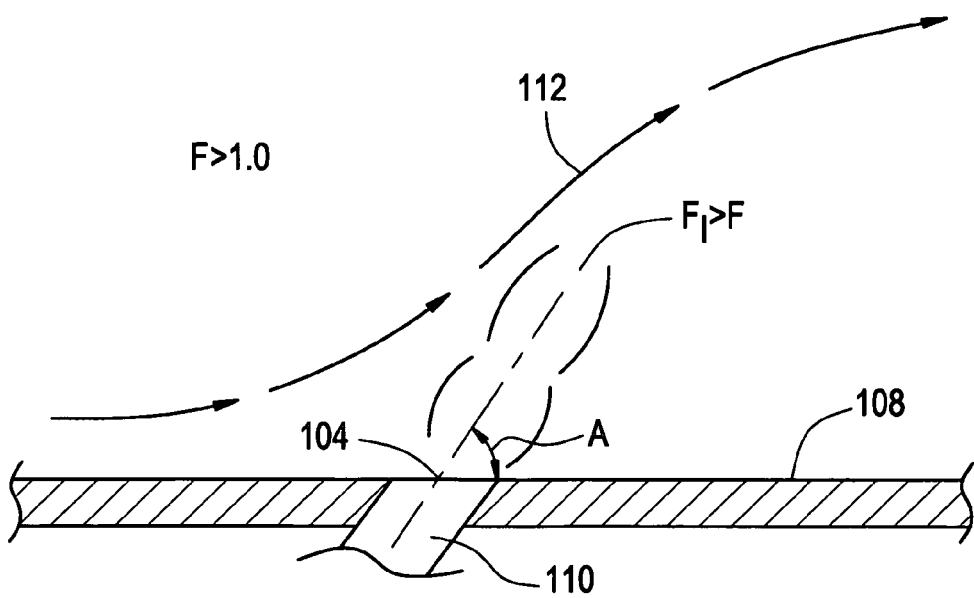
FIG. 2 is a diagrammatical representation of a supersonic injector according to an embodiment of the present invention.
Figure 3:
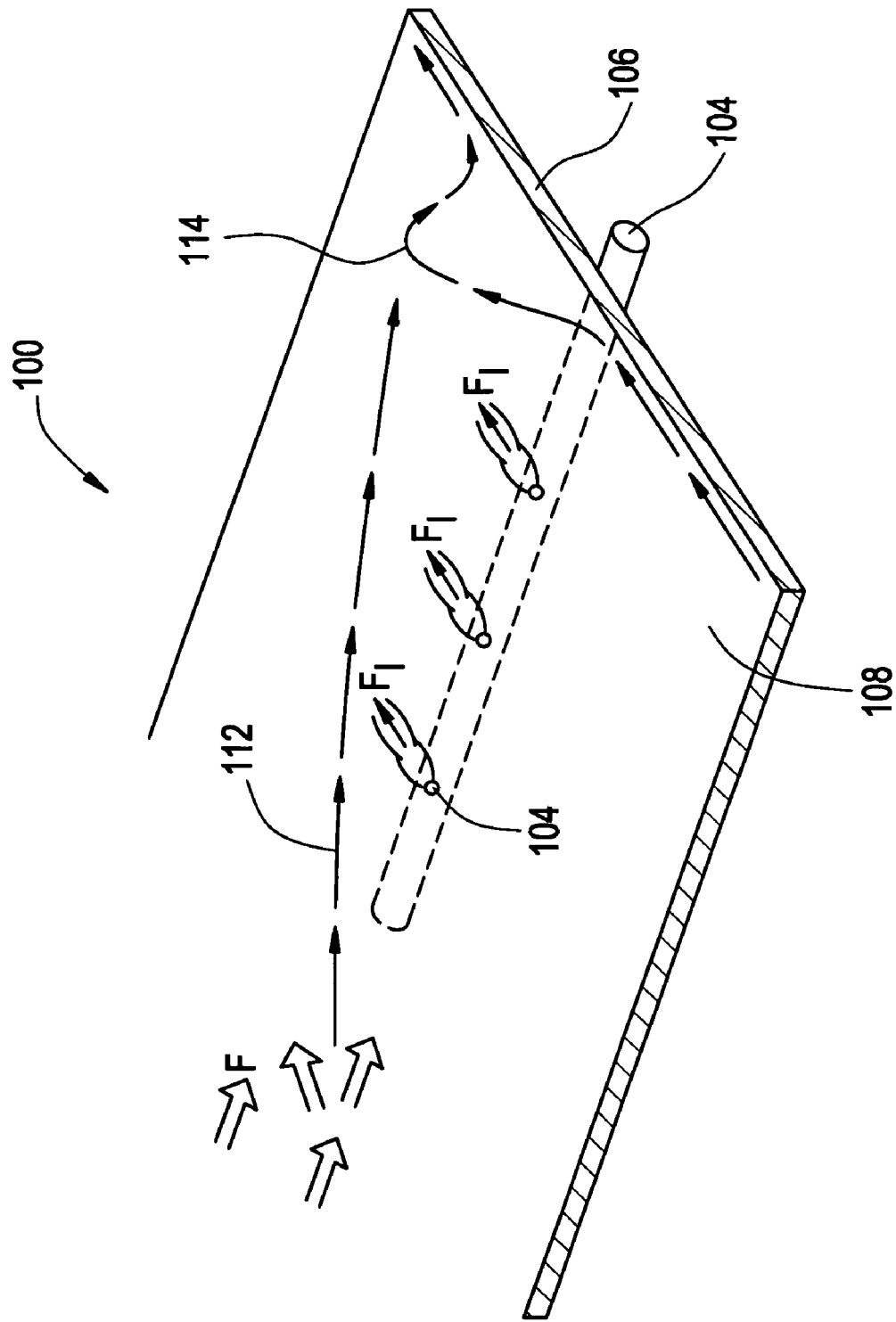
FIG. 3 is a diagrammatical representation of the flow of engine exhaust in an engine nozzle according to an embodiment of the present invention.
Figure 4:
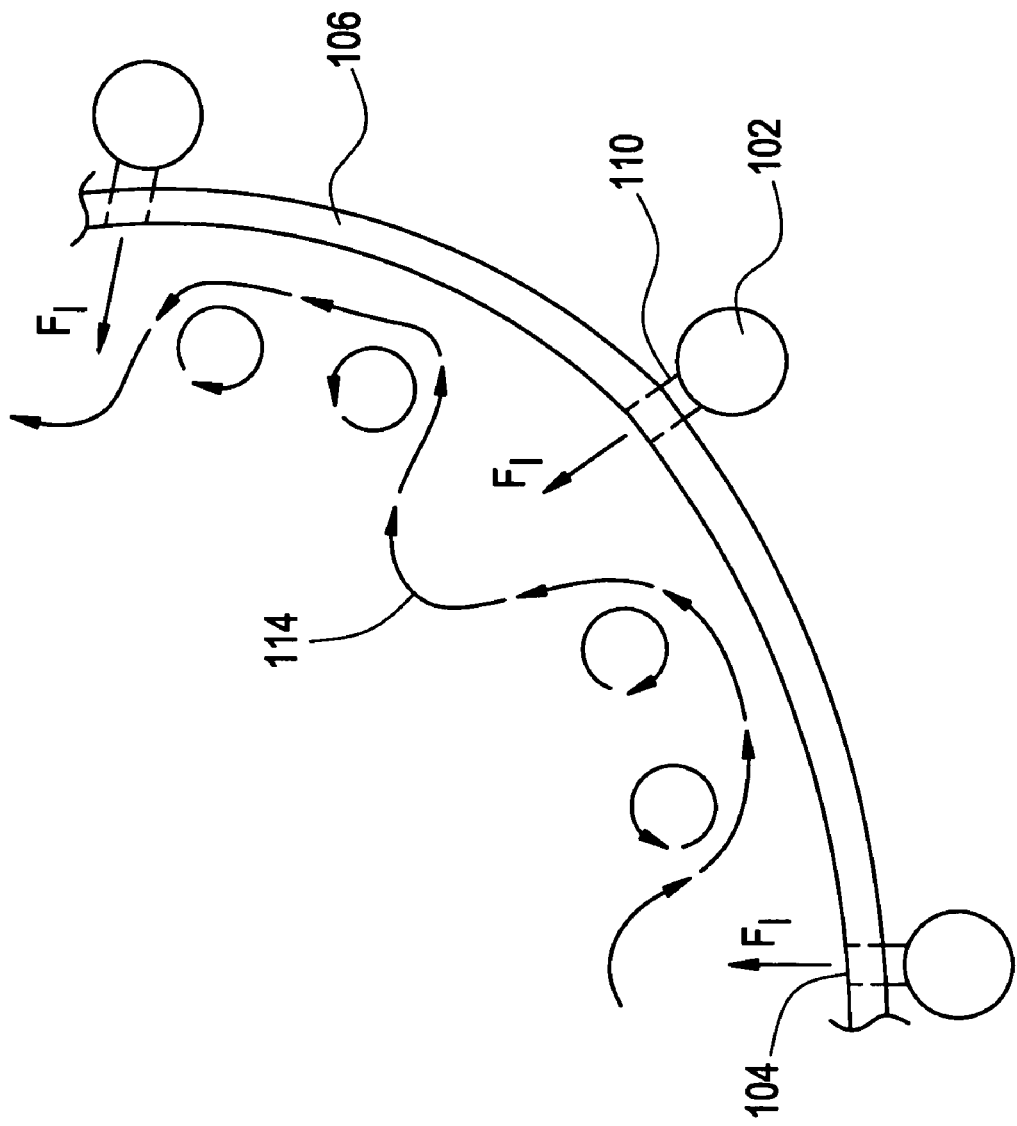
FIG. 4 is a diagrammatical representation of a portion of the exit of an engine nozzle according to an embodiment of the present invention.

FIG. 1 is a cross-sectional side view of an aircraft engine 10 with an exit portion 100 containing a noise reduction system according to an embodiment of the present invention, which contains a plurality of pulse detonation devices 102 used to direct supersonic flow through supersonic injectors 104 into the mean flow F of the engine exhaust. FIG. 2 is a cross-sectional view of a supersonic injector 104 coupled to a wall portion 108 of the engine exhaust. FIG. 3 is a partial cross-section view of an engine exhaust 100, according to an embodiment of the present invention, showing the effect of the injector flow $F_I$ on the engine mean flow F, and the virtual aerodynamic surface 112 which is created by the interaction of these flows. Finally, FIG. 4 is an end view of a portion of an engine nozzle showing a plurality of aero-lobes 114, which are created by the operation of the supersonic injectors 104 of the present invention.

Turning now to FIG. 1, an exemplary embodiment of the present invention is shown. In this embodiment, an engine exhaust section 100 is coupled to a plurality of pulse detonation devices 102 via a plurality of supersonic injectors 104. As shown in this embodiment each of the pulse detonation devices 102 have three supersonic injectors 104 coupled to a wall 108 of the exhaust 100. However, the present invention is not limited to this configuration, as the number of injectors 104 used may vary depending on the specific requirements of the application.

In an embodiment of the invention, each of the pulse detonation devices 102 use either pulsed detonation or deflagration to generate supersonic flow which is directed through and exits from the supersonic injectors 104 into the mean flow F of the engine exhaust 100. As the flow $F_I$ from the injectors 104 expands out, away from the wall 108, the injector flow $F_I$ forms a small shock cell that effectively creates an obstacle for the mean flow F of the engine. This interaction creates a shock-front 112, or virtual surface, which effectively redirects or controls the flow direction of the mean flow F.

In an embodiment of the present invention, the speed of the injector flow $F_I$ is such that the size and shape of the shock-front 112 is made to reduce the shock cell strength within the mean flow F of the engine exhaust. This is accomplished by effectively controlling the effective area ratio of the engine nozzle at its exit 106.

Although the above discussion is directed to having a supersonic flow exiting the injectors 104, in an alternative embodiment, the flow is not necessarily supersonic, but simply has a higher pressure then the exhaust flow of the engine. This allows the injector flow to penetrate the exhaust flow, as discussed above. In this embodiment, detonation is not necessary, but just a pressure rise due to deflagration, where the pressure is significant enough to allow the injector flow to penetrate the exhaust flow.

In a further embodiment, only the flow from some of the injectors 104 is supersonic, while the flow from the other injectors 104 is below supersonic. In this embodiment, the flow from the upstream most injector(s) 104 are supersonic, while the flow from the downstream most injectors(s) 104 is less than supersonic. The flow from the first injector(s) 104 are supersonic because the flow from the injector(s) 104 is injected into the supersonic mean flow of the exhaust. However, after the initial shock wave interactions (between the mean flow and the injector flow) the mean flow slows to subsonic, thus the flow from the most downstream injector(s) 104 may be subsonic. For example, an embodiment of the invention has four injectors 104 for each pulse detonation device 102, where the flow from the two upstream most injectors 104 is supersonic and the flow from the downstream two injectors 104 is subsonic.

In an embodiment of the present invention, one or more injectors 104 are positioned very close to, or at the edge, of the nozzle to achieve the desired results. The injectors 104 may be positioned or embedded in the nozzle lip (not shown) or on the pylon (not shown) close to the nozzle exit.

As explained previously, when an over or under expansion condition exists at the nozzle exit 106, shock cells form in the jet plume. The interaction of shear in the jet flows and these shock cells generates a significant amount of noise, primarily broadband. The strength of these shock cells, and thus the resultant noise, can be reduced by controlling the exhaust area ratio of the engine nozzle, and the present invention accomplishes this through the use of the shock front 112, generated by the interaction between the mean flow F and the injector flow $F_I$. In addition to noise reduction, the present invention can be used to aid in the reduction of the infrared signature of engine exhaust.

FIG. 2 depicts a supersonic injector 104, in accordance with an embodiment of the present invention. As shown, in this embodiment, the exit of the injector 104 is positioned flush with the wall 108 of the exhaust nozzle. Further, the as indicated previously, although the mean flow F is typically greater than 1.0 Mach, the injector flow $F_I$ velocity is greater than the mean flow F. This permits the injector flow $F_I$ to penetrate the mean flow, thus creating a shock-front 112, which controls or redirects the mean flow F.

In an exemplary embodiment of the present invention, the injector 104 is angled A with respect to the surface 108. In an embodiment of the present invention, the angle A between the exit angle of the injector 104 and the surface 108 is between 10 and 170 degrees (where angles between 90 and 170 degrees are directed upstream into the mean flow F. In another embodiment, the angle A is between 10 and 90 degrees. In a further embodiment, the angle A is 45 degrees. The angle A is optimized based on the operational characteristics and parameters of the engine, so as to provide maximum noise reduction.

Figure 5:
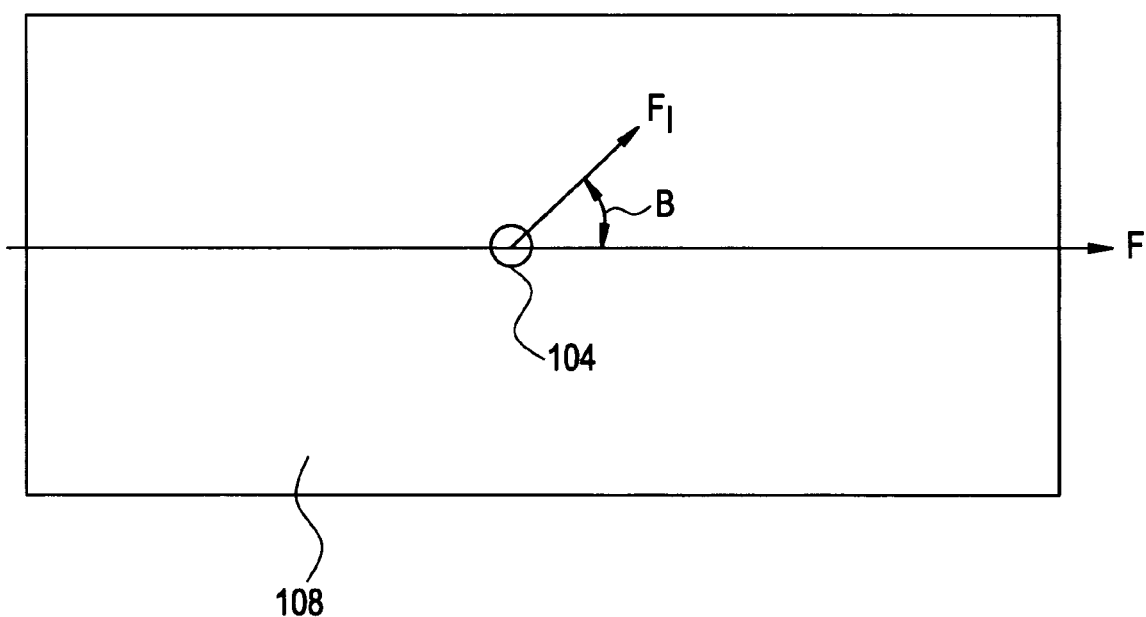
FIG. 5 is a diagrammatical representation of the flow of an injector with respect to a mean flow of the engine in accordance with an embodiment of the present invention.

In a further embodiment of the present invention, the supersonic injectors 104 have a yaw angle with respect to the mean flow F, as shown in FIG. 5, so as to provide an additional means of control of the size of the obstacle, and hence the shape of the interaction surface or aero-lobe. When the injection is into a subsonic area of the mean flow F, this yaw angle can also be tailored to create longitudinal vortices in the flow of the exhaust of the engine that help in efficient mixing of the flow, reducing jet noise further. In an embodiment of the present invention, the yaw angle B between the exit angle of the injector 104 and the mean flow F is between −90 and 90 degrees. In another embodiment, the yaw angle B is 45/−45 degrees. The yaw angle B is optimized based on the operational characteristics and parameters of the engine, so as to provide maximum noise reduction.

In the present invention, the injectors 104 have a configuration and exit cross-section selected to optimize system performance. It is contemplated that the geometry of the injectors 104 may have a cross-sections which are constant area, diverging, converging, conical, square, elliptical, or polygonal. In another embodiment of the present invention, the injectors 104 are shaped as converging-diverging nozzles so as to provide additional velocity as the injector flow exits the injectors 104, and the exit area is circular.

FIG. 3 depicts a partial cross-section of an engine exhaust 100 according to an embodiment of the present invention. As shown in this non-limiting embodiment, the pulse detonation device provides supersonic injection flow $F_I$ through three injectors 104, which run longitudinally along a length of the exhaust nozzle. Each of the injectors 104 provide a supersonic injector flow $F_I$, which is injected into the exhaust so as to create the shock front 112.

In an embodiment of the present invention, the pulse detonation device 102, or devices, and the injectors 104 are configured such that the velocity of the injector flow $F_I$ from the most upstream injector 104 is the least of the injectors 104, and the velocity of the flow $F_I$ from the downstream most injector 104 is most of the injectors 104. This configuration allows for the creation of a shock front 112 which increasingly separates from the wall 108 as it travels downstream, such that the shock front is at its maximum distance from the wall 108 at the exit 106. In one embodiment, this velocity differential is achieved through different injector 104 geometry. For example, the aft most injector 104 would have the largest nozzle area so as to permit more flow and velocity, whereas the forward most injector 104 would have the smallest nozzle area. In an alternative embodiment, the nozzle areas of the injectors 104 are made variable so that the exit velocity can be controlled and varied based on the engine operational characteristics and parameters.

In a further embodiment of the present invention, which has multiple pulse detonation devices 102, the devices 102 are functioned such that their operations are not simultaneously overlapping. Thus, during operation the detonation or deflagration stages of the respective devices 102 are varied such that the detonation/deflagration of the devices 102 occur at different times. For example, in a non-limiting embodiment, while half of the pulse detonation devices 102 are in a fill stage (prior to detonation/deflagration), the remaining devices 102 are in the detonation/deflagration stage and providing the supersonic flow to the injectors 104. In an embodiment, every other device 102, positioned radially around the exhaust fires together, while the remaining devices 102 fire at some set time after the first grouping of devices 102. In a further embodiment, the operational frequencies of the devices 102 are varied such that a number of the devices have a first operational frequency, while the remaining devices 102 have a second operational frequency.

In another embodiment of the invention, the plurality of devices 102 are fired such that the shock front 112 "clocks" around the interior of the wall 108. For example, in an embodiment, each of the devices 102 are fired sequentially, in a circumferential pattern, either clockwise or counterclockwise, around the exhaust 100. With this operation the shock front 112 will essentially rotate around the wall 108. Alternatively, it is contemplated that the devices 102 can be fired in opposite pairs (i.e. the two devices 102 which are positioned opposite each other with respect to the exhaust 100), and this signal is rotated around in a circumferential fashion to achieve a similar effect as described above. Such an operation would aid in controlling (either exciting or disrupting) the azimuthal/circumferential modes in the exhaust to control the mixing characteristics. In yet another embodiment, multiple such rotating patterns of variable injectors firing, with frequencies and timing controlled by a control system, are used to achieve the same affect.

In an additional embodiment of the present invention, the velocity of the injector flow $F_I$ is varied through the operational envelope of the engine. Specifically, the operational parameters of the devices 102 are varied based on the operational state and performance needs of the engine such that the respective velocities of the injector flows $F_I$ are variable. This allows the shock front 112 and aero-lobe geometry to be varied so as to optimize engine performance and noise reduction. In an alternative embodiment, the injector velocities $F_I$ are automatically controlled via a computer system, which takes into account the relevant operational parameters and characteristics to optimize noise reduction and exhaust efficiency. For example, the injector velocities are varied as a function of the mean flow velocity.

In one embodiment of the present invention, which contains a plurality of pulse detonation devices 102, the devices 102, and their respective injectors 104, are positioned symmetrically around the periphery of the exhaust nozzle. This configuration provides a relatively symmetrical shock front 112 within the engine.

In an alternative embodiment of the present invention, a plurality of pulse detonation devices 102, and their respective injectors 104, are positioned asymmetrically with respect to the engine nozzle so as to provide noise reduction asymmetrically. For example, in a commercial aircraft application the pulse detonation devices 102, along with their respective injectors 104, are positioned along the side of the exhaust nozzle adjacent to the fuselage of the aircraft. This configuration creates a shock front 112 and aero lobes along one side of the engine (the side adjacent the fuselage) which would reduce the broadband noise directed towards the fuselage, with little regard for the noise normally propagated away from the fuselage.

Similar in both military and commercial applications, the pulse detonation devices 102, along with their respective injectors 104, are positioned along the bottom of the exhaust nozzle. This configuration creates a shock front 112 and aero lobes along the bottom of the engine which would reduce the broadband noise directed towards the ground, with little regard for the noise normally propagated away from the ground.

FIG. 4 depicts a view at the engine exit 106 showing the virtual or aero-lobes 114 created by the injection of the supersonic injector flow $F_I$. As shown, the lobes 114 are created where the injectors 104 direct the flow $F_I$ into the engine exhaust. As shown in this figure, the lobes 114 allow control of the exit area ratio and enhances mixing for the overall broadband jet noise reduction. The size of the lobes 114, and thus the exit area are controlled by the velocity at which the injector flow $F_I$ exits the injectors 104.

As shown in the FIG. 4 embodiment, the pulse detonation devices 102 are positioned externally with regard to the exhaust portion, and the injectors 104 are flush with the wall 108. However, in an alternative embodiment the devices 102 are either partially integrated into the wall 108 or are completely internal to the wall, with the injectors 104 being extended into the mean flow F of the exhaust.

Although the above discussion has been primarily directed to the use of the present invention in conjunction with aircraft engines, those of ordinary skill in the art will recognize that the present invention may be used with any engine device having the same or similar issues regarding noise generation or where it is desirable to control the exit area or infrared signature of an exhaust of the engine.

Further, while the invention has been described in terms of various specific embodiments, those skilled in the art will recognize that the invention can be practiced with modification within the spirit and scope of the claims.

What is claimed is:

1. An aircraft engine, comprising:
   an exhaust nozzle portion having a wall surface, wherein said exhaust nozzle portion directs a mean exhaust flow to an engine exit;
   at least one pulse detonation device coupled to said exhaust nozzle portion; and
   a plurality of injectors coupled to said at least one pulse detonation device and said wall surface, wherein exhaust of said at least one pulse detonation device is directed through said injectors into said exhaust nozzle portion as injector flow, wherein said injector flow is supersonic.

2. The aircraft engine of claim 1, wherein a velocity of the injector flow is greater than a velocity of said mean flow.

3. The aircraft engine of claim 1, wherein said injectors run longitudinally along a length of said exhaust nozzle portion.

4. The aircraft engine of claim 1, wherein an exit portion of each of said injectors is flush with said wall surface.

5. The aircraft engine of claim 1, wherein each of said injectors are configured such that said injector flow from each of said injectors is angled with respect to said mean flow.

6. The aircraft engine of claim 5, wherein the angle of said injector flow is between 10 and 170 degrees.

7. The aircraft engine of claim 5, wherein the angle of said injector flow is between 10 and 90 degrees.

8. The aircraft engine of claim 5, wherein the angle of said injector flow is 45 degrees.

9. The aircraft engine of claim 1, further comprising a plurality of said pulse detonation devices, each of which are coupled to a plurality of injectors, wherein an exhaust of each of said pulse detonation devices is directed through the respective injectors of each of said pulse detonation devices into said exhaust nozzle portion.

10. The aircraft engine of claim 9, wherein said injectors are distributed symmetrically with respect to the exhaust nozzle portion.

11. The aircraft engine of claim 9, wherein said injectors are distributed asymmetrically with respect to the exhaust nozzle portion.

12. The aircraft engine of claim 9, wherein the operation of all of said pulse detonation devices is synchronized.

13. An aircraft engine comprising:
an exhaust nozzle portion having a wall surface, wherein said exhaust nozzle portion directs a mean exhaust flow to an engine exit;
at least one pulse detonation device coupled to said exhaust nozzle portion; and
a plurality of injectors coupled to said at least one pulse detonation device and said wall surface, wherein exhaust of said at least one pulse detonation device is directed through said injectors into said exhaust nozzle portion as injector flow, wherein a velocity of the injector flow from any one of said injectors is different from each of the remaining injectors.

14. An aircraft engine comprising:
an exhaust nozzle portion having a wall surface, wherein said exhaust nozzle portion directs a mean exhaust flow to an engine exit;
at least one pulse detonation device coupled to said exhaust nozzle portion; and
a plurality of injectors coupled to said at least one pulse detonation device and said wall surface, wherein exhaust of said at least one pulse detonation device is directed through said injectors into said exhaust nozzle portion as injector flow, wherein said injectors are positioned longitudinally along a length of said exhaust nozzle portion and a velocity of the injector flow from the downstream most injector is greater than each of the remaining injectors, and a velocity of the injector flow from the upstream most injector is less than each of the remaining injectors.

15. An aircraft engine comprising:
an exhaust nozzle portion having a wall surface, wherein said exhaust nozzle portion directs a mean exhaust flow to an engine exit;
at least one pulse detonation device coupled to said exhaust nozzle portion; and
a plurality of injectors coupled to said at least one pulse detonation device and said wall surface, wherein exhaust of said at least one pulse detonation device is directed through said injectors into said exhaust nozzle portion as injector flow, wherein a velocity of the injector flow from each of the injectors is controlled as a function of a velocity of the mean flow.

16. An aircraft engine comprising:
an exhaust nozzle portion having a wall surface, wherein said exhaust nozzle portion directs a mean exhaust flow to an engine exit;
a plurality of pulse detonation devices coupled to said exhaust nozzle portion;
a plurality of injectors coupled to respective ones of said pulse detonation devices and said wall surface, wherein an exhaust of each of said pulse detonation devices is directed through a respective one of said injectors into said exhaust nozzle portion as injector flow, wherein at least some of said pulse detonation devices are operated sequentially.

17. The aircraft engine of claim 16, wherein said at least some of said pulse detonation devices are operated sequentially either clockwise or counterclockwise around said exhaust nozzle portion.

18. A method of reducing noise from the exhaust of an aircraft engine; the method comprising:
passing a mean flow of exhaust gas through an exhaust nozzle portion of the engine;
operating at least one pulse detonation device to generate pulse detonation exhaust;
passing said pulse detonation exhaust through a plurality of injectors; and
injecting said pulse detonation exhaust into said mean flow at a velocity greater than a velocity of said mean flow, wherein said pulse detonation exhaust from one of said injectors is injected into said mean flow at a first velocity and said pulse detonation exhaust from another of said injectors is injected into said mean flow at a second velocity.

19. The method of claim 18, wherein the pulse detonation exhaust is injected into said mean flow symmetrically with respect to said mean flow.

20. The method of claim 18, wherein said pulse detonation exhaust is injected into said mean flow at an angle with respect to said mean flow.

21. The method of claim 20, wherein said angle is in the range of 10 to 170 degrees.

22. The method of claim 20, wherein said angle is in the range of 10 to 90 degrees.

23. The method of claim 20, wherein said angle is 45 degrees.

24. The method of claim 18, wherein the pulse detonation exhaust is injected into said mean flow asymmetrically with respect to said mean flow.

25. The method of claim 18, wherein the pulse detonation exhaust is injected sequentially into said mean flow from at least some of said injectors.

26. A method of reducing noise from the exhaust of an aircraft engine; the method comprising:
passing a mean flow of exhaust gas through an exhaust nozzle portion of the engine;
operating at least one pulse detonation device to generate pulse detonation exhaust;
passing said pulse detonation exhaust through a plurality of injectors;
injecting said pulse detonation exhaust into said mean flow at a velocity greater than a velocity of said mean flow; and
changing the velocity of said pulse detonation exhaust based on changes in velocity of said mean flow.

27. A method of reducing noise from the exhaust of an aircraft engine; the method comprising:
- passing a mean flow of exhaust gas through an exhaust nozzle portion of the engine;
- operating at least one pulse detonation device to generate pulse detonation exhaust;
- passing said pulse detonation exhaust through a plurality of injectors; and
- injecting said pulse detonation exhaust into said mean flow at a velocity greater than a velocity of said mean flow, wherein the velocity of said pulse detonation exhaust as it is injected into said mean flow is supersonic.

28. A method of creating a virtual flow structure in the exhaust of an engine; the method comprising:
- passing a mean flow of exhaust gas through an exhaust nozzle portion of the engine;
- operating a pulse detonation device to generate pulse detonation exhaust;
- passing said pulse detonation exhaust through a plurality of injectors; and
- injecting said pulse detonation exhaust into said mean flow at a velocity greater than a velocity of said mean flow, wherein the velocity of said pulse detonation exhaust as it is injected into said mean flow is supersonic.

* * * * *